(12) United States Patent
Okoshi et al.

(10) Patent No.: US 8,327,826 B2
(45) Date of Patent: Dec. 11, 2012

(54) KNOCK CONTROL DEVICE FOR ENGINE

(75) Inventors: Satoru Okoshi, Wako (JP); Kenichi Machida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 425 days.

(21) Appl. No.: 12/718,349

(22) Filed: Mar. 5, 2010

(65) Prior Publication Data

US 2010/0242909 A1 Sep. 30, 2010

(30) Foreign Application Priority Data

Mar. 31, 2009 (JP) ................................ 2009-086062

(51) Int. Cl.
*F02P 5/00* (2006.01)
*F02P 5/04* (2006.01)

(52) U.S. Cl. ................................ 123/406.23; 701/111

(58) Field of Classification Search ............ 123/406.24, 123/406.23, 406.21, 406.29; 701/111; 73/35.09
See application file for complete search history.

(56) References Cited

U.S. PATENT DOCUMENTS

| | | | |
|---|---|---|---|
| 4,711,212 A * | 12/1987 | Haraguchi et al. | 123/406.38 |
| 4,711,213 A * | 12/1987 | Sakakibara et al. | 123/406.35 |
| 4,788,957 A * | 12/1988 | Komurasaki | 123/406.16 |
| 5,088,044 A | 2/1992 | Matsuura | |
| 7,010,418 B2 * | 3/2006 | Sauler et al. | 701/111 |
| 2004/0084022 A1 * | 5/2004 | Kinose | 123/406.29 |
| 2005/0098156 A1 * | 5/2005 | Ohtani | 123/431 |
| 2005/0234633 A1 * | 10/2005 | Takemura et al. | 701/111 |
| 2006/0288981 A1 * | 12/2006 | Kaneko et al. | 123/406.37 |
| 2007/0016387 A1 | 1/2007 | Takemura | |
| 2007/0215109 A1 * | 9/2007 | Kaneko et al. | 123/406.34 |

FOREIGN PATENT DOCUMENTS

| | | |
|---|---|---|
| JP | 60-190670 A | 9/1985 |
| JP | 01-100375 | 4/1989 |
| JP | 2002-188504 | 7/2002 |

* cited by examiner

*Primary Examiner* — Mahmoud Gimie
(74) *Attorney, Agent, or Firm* — Squire Sanders (US) LLP (57) ABSTRACT

Embodiments of the invention provide that an ignition is retarded when continuously occurring knocks are detected, while an ignition is not retarded when a singly occurring knock is detected. By detecting the number of occurrences of detection data pieces from a knock sensor 9 stored in a storage unit 14 in a predetermined time period, a distribution of the detection data pieces is created. When one detection data piece having a value not less than a knock determination value is inputted from the knock sensor 9, the distribution of the detection data pieces is checked. For example, when the detection data pieces spread in a wide range, or the knock level voltage of the total detection data pieces is not less than a predetermined value, a retard instruction is outputted.

8 Claims, 5 Drawing Sheets

15 KNOCK DETERMINATION UNIT
16 DATA DISTRIBUTION DETECTION UNIT
18 RATE CALCULATION UNIT
19 RETARD DETERMINATION UNIT

FIG. 1

15 KNOCK DETERMINATION UNIT
16 DATA DISTRIBUTION DETECTION UNIT
18 RATE CALCULATION UNIT
19 RETARD DETERMINATION UNIT

FIG. 2

● WITH KNOCK(8000r/min)
▲ WITHOUT KNOCK(8000r/min)

23 KNOCK-DETERMINATION REFERENCE-VALUE STORAGE UNIT
24 AVERAGE-VALUE DETERMINATION UNIT

KNOCK CONTROL DEVICE FOR ENGINE

BACKGROUND

1. Field

Embodiments of the present invention relate to a knocking (hereinafter referred to as a knock) control device for an engine, and particularly relates to a knock control device for an engine which is capable of distinguishing between a knock requiring a retard of ignition timing and a knock not requiring a retard.

2. Description of the Related Art

Generally in an internal combustion engine, i.e., an engine, an ignition timing control is performed in which the ignition timing is optimized in the following manner. When it is determined that a knock has occurred, the ignition timing is retarded. On the other hand, when it is determined that a knock has not occurred, the ignition timing is gradually advanced. Japanese Patent Application Publication No. 2002-188504 (hereinafter JP '504) describes a knock control device in which vibrations occurring in an engine are detected by a knock sensor, a knock determination level is set based on a distribution in strength of the detected vibrations, and a presence or absence of an occurrence of a knock is determined by comparing the detected vibration and the knock determination level. The knock control device of JP '504 includes means for performing a fail operation when the vibration strength deviates from a distribution assumed in advance with regard to the strength distribution.

Meanwhile, Japanese Patent Application Publication No. Hei 01-100375 (hereinafter JP '375) proposes a knock control device considering that an output signal of a knock sensor includes an engine noise. When the level of the noise exceeds an average value, the knock control device regards this as a knock and then performs a control by retarding the ignition timing, thereby reducing operations with an excessive retard amount.

Knocks of an engine include knocks occurring continuously and knocks occurring singly. Among these, the continuously occurring knocks require optimization by retarding the ignition timing. By contrast, knocks occurring singly at a low frequency have a low impact on the engine, even though the ignition timing is not retarded.

In each of the knock control devices described in JP '504 and JP '375, when the vibration level is higher than a predetermined value, even a singly occurring knock is determined as a knock irrespective of the knock occurrence frequency, and thus an operation to retard the ignition timing is performed. In this case, after the operation for the singly occurring knock, an operation such as immediately putting back or advancing the ignition timing is also required. Such an operation of an advance or a retard imposes an unnecessary burden on a microcomputer constituting the control device. Accordingly, it is desirable that a determination of a singly occurring knock less frequently involve operations of a retard or advance. Meanwhile, when a combustion is not determined as a knock due to a low vibration level but involves knocks occurring continuously, there might exist a case where the ignition timing should be retarded from a viewpoint of engine protection.

SUMMARY

To solve the aforementioned problem, an object of the present invention is to provide a knock control device for an engine, the knock control device being configured, from a viewpoint of engine protection, to establish a state where a knock combustion is prevented, by including a time-based determination, instead of knock determination based on the knock vibration level.

A first aspect of the present invention for achieving the above-described object is a knock control device for an engine which includes: knock determination means for determining whether or not a level of each of detection data pieces detected by a knock sensor attached to the engine is not less than a predetermined knock determination value; and engine output reduction means for reducing engine output when the knock determination means determines that a knocking has occurred. The knock control device includes data distribution detection means for detecting a distribution, for each predetermined time period, in number of occurrences of the detection data pieces in association with knock level voltages of the respective detection data pieces, wherein when determining that the level of the detection data piece is not less than the knock determination value, the knock determination means determines a necessity of engine output reduction on the basis of the distribution in number of occurrences of the detection data pieces.

In addition, a second aspect of the present invention is a knock control device for an engine which includes a knock sensor which is attached to the engine and outputs a voltage value corresponding to vibration of the engine as a detection data piece; data distribution detection means for detecting a distribution of a plurality of the detection data pieces inputted from the knock sensor in a predetermined time period, for each of voltage values of the respective detection data pieces, by allocating the detection data pieces to voltage regions set stepwise, on the basis of the voltage values of the respective detection data pieces; peak-area detection means for detecting one of the voltage regions as a peak area on the basis of the distribution of the detection data pieces, the one of the voltage regions having the largest number of detection data pieces allocated thereto; rate calculation means for calculating a rate of the number of detection data pieces included in the peak area detected by the peak-area detection means, by dividing the number of detection data pieces included in the peak area by a total number of data pieces detected within the predetermined time period; and retard determination means for outputting an ignition retard instruction when the rate calculated by the rate calculation means is not more than a retard determination rate, wherein the retard determination means is configured to be energized when the level of the detection data piece from the knock sensor is not less than a predetermined knock determination voltage.

Moreover, a third aspect of the present invention is a knock control device for an engine including a knock sensor which is attached to the engine and outputs a voltage value corresponding to vibration of the engine as a detection data piece; data distribution detection means for detecting a distribution of a plurality of the detection data pieces inputted from the knock sensor in a predetermined time period, for each of voltage values of the detection data pieces, by allocating the detection data pieces to voltage regions set stepwise, on the basis of the voltage values of the respective detection data pieces; averaging means for calculating an average value of the number of a plurality of the detection data pieces outputted within the predetermined time period by dividing a total number of the detection data pieces by the number of the voltage regions to which the detection data pieces are allocated; and retard determination means for outputting an ignition retard instruction when the average value of the number of the detection data pieces which is calculated by the averaging means is not more than a retard determination average value, wherein the retard determination means is configured to be energized when the level of the detection data piece from the knock sensor is not less than a predetermined knock determination voltage.

Furthermore, a fourth aspect of the present invention is a knock control device for an engine including a knock sensor which is attached to the engine and outputs a voltage value corresponding to vibration of the engine as a detection data piece; data distribution detection means for detecting a distribution of a plurality of the detection data pieces inputted from the knock sensor in a predetermined time period, for each of voltage values of the detection data pieces, by allocating the detection data pieces to voltage regions set stepwise, on the basis of voltage values of the respective detection data pieces; averaging means for calculating an average value of knock level voltages of a plurality of the detection data pieces outputted within the predetermined time period by dividing a sum of the knock level voltages of the detection data pieces by the number of the detection data pieces outputted within the predetermined time period; and retard determination means for outputting an ignition retard instruction when the average value calculated by the averaging means is not less than a retard determination average value, wherein the retard determination means is configured to be energized when the level of the detection data piece from the knock sensor is not less than a predetermined knock determination voltage.

Further embodiments of the invention are directed to a method for monitoring knocks in an engine. The method includes determining whether a level of each of a plurality of detection data pieces, detected by a knock sensor attached to an engine, is not less than a predetermined knock determination value. The method may then include reducing engine output when it is determined that the level of the plurality of detection data pieces is not less than a predetermined knock determination value.

According to embodiments of the present invention, in a case of a singly occurring knock, even though the level of the detection data piece detected by the knock sensor exceeds the knock determination value, a retard of the ignition timing is not performed immediately. In addition, even though the level of the knock is lower than the determination value, a retard of the ignition timing can be performed depending on the occurrence frequency. Specifically, the ignition timing can be retarded in the following manner. The distribution in number of occurrences of data pieces detected by the knock sensor within the predetermined time period is checked. Only when it is determined, based on the distribution, that a knock determination has been made while the detection data piece has occurred at a high frequency, a retard instruction is issued.

This means that the retard instruction is not issued even though the high-level detection data piece occurs singly. Accordingly, the ignition timing is not changed more than necessary, and thus it is possible to establish a state in which the engine is operable at optimum ignition timing at any time. Moreover, the processing burden on the control device including a central processing unit (CPU) can be reduced. Furthermore, also in a case where a high-level knock is expected to occur while knocks are occurring at a low level but a high frequency, the ignition timing is retarded in advance. Accordingly, the engine can be protected favorably.

DETAILED DESCRIPTION

Figure 2:
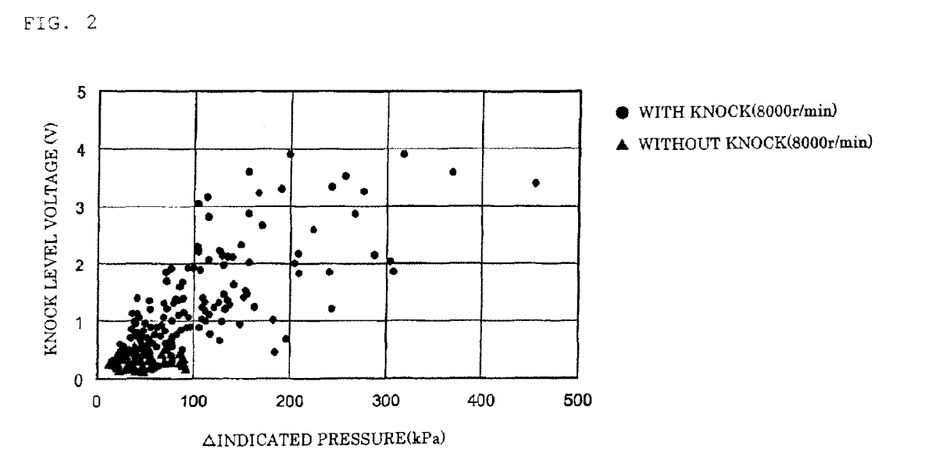
FIG. 2 is a graph showing an example of signals detected by a knock sensor.

FIG. 2 shows the result of an experiment in which knock levels, i.e., output voltages of a knock sensor to be described later, are detected at a predetermined sampling frequency. In FIG. 2, the horizontal axis represents an amount of change (Δ indicated pressure) in pressure (indicated pressure) in a cylinder of an engine, that is, a difference (absolute value) between the previous value and the current value.

In the graph of FIG. 2, marks shown by black dots are output values of a knock sensor, determined as presence of a knock, for example, by the method described in JP '504. Marks shown by black triangles are output values of the knock sensor, determined as absence of a knock by the same method. As learned from this graph, there is a difference between a distribution of detection signals determined as presence of a knock and a distribution of detection signals determined as absence of a knock. In other words, the detection signals determined as presence of a knock are distributed widely, while the detection signals determined as absence of a knock are limited in a narrow range.

In this regard, embodiments of the present invention are intend to: not immediately retard ignition timing even when an output voltage of the knock sensor is such a large value as to exceed a knock determination voltage; but to perform a retard necessity determination, as described in the following, on the basis of the distribution status of signals detected by the knock sensor within a predetermined time period, and to then determine whether or not a retard is performed based on the determination result.

Figure 3:
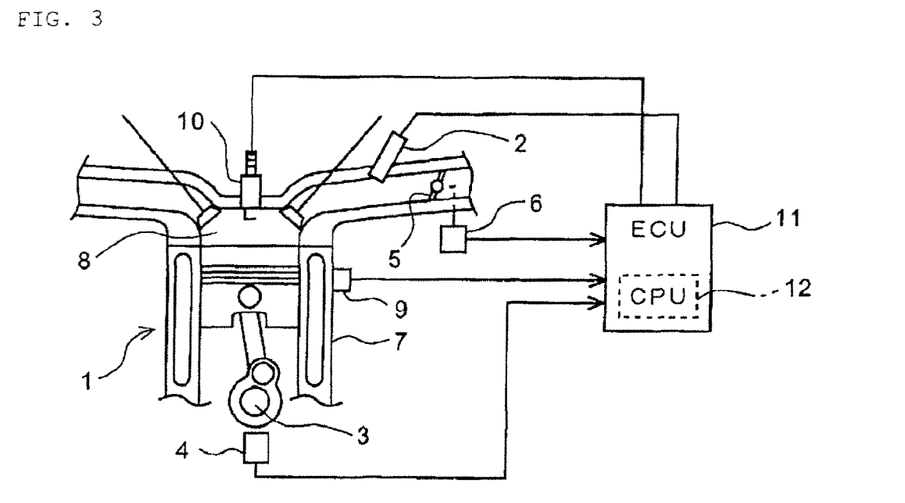
FIG. 3 is a system configuration diagram of the knock control device according to an embodiment of the present invention.

FIG. 3 is a system configuration diagram of a knock control device for an engine according to one embodiment. In FIG. 3, an engine 1 is a 4-cycle water-cooled engine having a fuel injector 2. The engine 1 includes a revolution sensor 4 which detects the number of revolutions of a crank shaft 3, a throttle sensor 6 which detects the opening degree of a throttle valve 5, and a knock sensor 9 placed near a combustion chamber 8 on an outer wall surface of an engine cylinder 7 having a water jacket. The combustion chamber 8 is provided with an ignition device (ignition plug) 10.

An engine control unit (ECU) 11 has functions of: reading detection signals from the revolution sensor 4 and the throttle sensor 6, thereby calculating an amount of fuel to be injected by the fuel injector 2 and ignition timing by the ignition device 10; and then giving instructions to the fuel injector 2 and the ignition device 10.

The knock sensor 9 outputs a voltage signal corresponding to the vibration strength of the cylinder 7 as a detection data piece. The ECU 11 has functions of: reading the detection data piece from the knock sensor 9 at a predetermined sampling frequency; performing a knock determination; and then retarding the ignition timing of the ignition device 10 based on the determination result. The ECU 11 is provided with a microcomputer (CPU) 12. A fuel injection amount, ignition timing, retard processing based on the knock determination, and the like are implemented as functions of the CPU 12.

Figure 4:
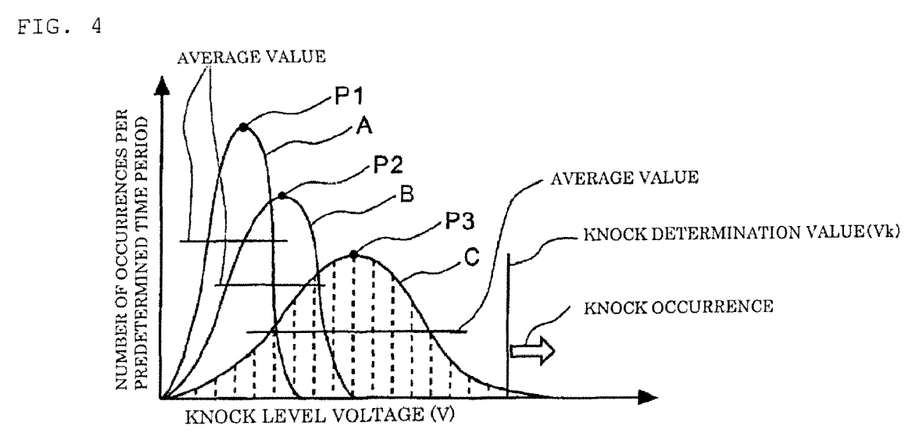
FIG. 4 is a graph showing a distribution, for each knock level voltage, in the number of occurrences of detection signals.

FIG. 4 is a graph showing an example of distributions of detection data pieces (knock level voltages) of the knock sensor 9 detected within the predetermined time period. The horizontal axis represents a knock level voltage, and the vertical axis represents the number of occurrences of detection data pieces for each knock level voltage in the predetermined period. In a distribution A in the graph, many detection data pieces are detected only in a region having a low knock level voltage and the detection data pieces are concentrated in a small area. Meanwhile, while a distribution B and a distribution C are observed sequentially, detection data pieces also occur in a region having a high knock level voltage, detection data pieces are spread over a wide area, and there is a decrease in rate of the largest number of occurrences of knock level voltages in total detection data pieces. In other words, a peak value P3 of the distribution C is lower than peak values P1 and P2 of the distributions A and B.

The distribution A represents a distribution of knock level voltages determined as absence of a knock among sampling data pieces shown in FIG. 2. The distribution C represents a distribution of knock level voltages determined as presence of a knock. The distribution B is an example of a distribution intermediary between the distributions A and C, and, in this embodiment, is in a distribution status determined not to require a retard.

When detected, a knock level voltage higher than a knock determination value Vk is determined as an occurrence of a knock in a primary determination step. However, even when detected, such a knock level voltage is not regarded as a knock requiring a retard as long as the knock level voltage occurs singly.

In view of this, the following determination is made in this embodiment. Specifically, when a knock level voltage exceeds the knock determination value Vk, a knock level voltage (peak area to be described later) having the highest concentration of detection data pieces in the predetermined time period is detected. Then, a calculation is made of how much the number of occurrences of detection data pieces included in the peak area accounts for the total number of detection data pieces detected within the predetermined time period. Only when the rate is not more than a preset rate, for example, when detection data pieces of the knock sensor 9 spread over a large area as shown in the distribution C, it is determined that a knock level voltage requiring a retard is detected.

Figure 1:
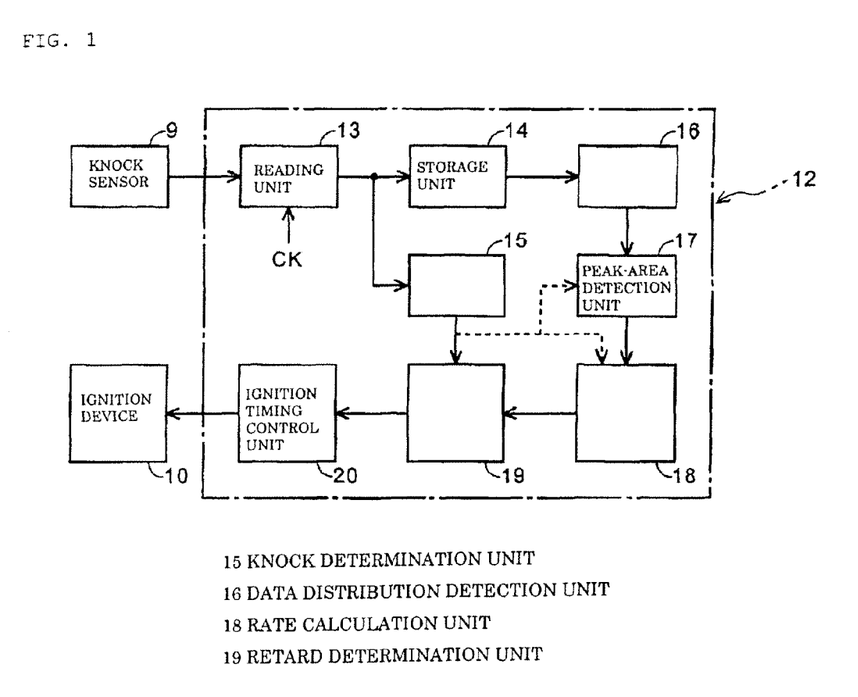
FIG. 1 is a block diagram showing functions of a chief section of a knock control device according to an embodiment of the present invention.

FIG. 1 is a block diagram showing functions of a chief section of the CPU 12 according to the knock control device. In FIG. 1, a reading unit 13 reads a knock level voltage (detection data piece), which is a detection data piece from the knock sensor 9, every time a clock CK is inputted. The read detection data piece is stored in a storage unit 14, and concurrently inputted to a knock determination unit 15. The storage unit 14 is capable of storing a predetermined number of detection data pieces. When the number of the inputted detection data pieces reaches the predetermined number, the oldest data piece is rewritten with a new detection data piece and consequently erased. Accordingly, the storage unit 14 stores detection data pieces read in a time period determined based on the reading frequency and the number of data pieces to be stored. The knock determination unit 15 compares each of the detection data pieces with the knock determination value Vk. When a value of the detection data piece is not less than the knock determination value Vk, the knock determination unit 15 outputs a knock detection signal.

A data distribution detection unit 16 compares each detection data piece stored in the storage unit 14 with multiple knock level thresholds set stepwise, and then determines which one of multiple knock level regions divided for the respective plural knock level thresholds includes the detection data piece. In other words, each detection data piece corresponding to the knock level voltage is allocated to a corresponding one of the knock level regions, so that a distribution of the detection data pieces for each knock level region is determined.

A peak-area detection unit 17 detects a knock level region (peak area) having the largest number of detection data pieces among the knock level regions. A rate calculation unit 18 calculates a peak-area-data-piece rate RATE by the following calculation. Specifically, the number of detection data pieces in the peak area detected by the peak-area detection unit 17, which is the number of detection data pieces PDN included in the knock level region having the largest number of occurrences of detection data pieces, is divided by the total number of detection data pieces DN stored in the storage unit 14.

A retard determination unit 19 compares the peak-area-data-piece rate RATE with a predetermined retard determination rate RATEref. When the peak-area-data-piece rate RATE is not more than the retard determination rate RATEref (RATE≦RATEref), the retard determination unit 19 outputs a retard instruction.

The retard instruction is inputted to an ignition timing control unit 20, and the ignition timing control unit 20 supplies the ignition device 10 with an ignition signal for retarding the ignition timing by a predetermined ignition angle.

In one configuration illustrated in FIG. 1, the peak-area detection unit 17, the rate calculation unit 18 and the retard determination unit 19 may be operated when the knock determination unit 15 determines presence of a knock. Alternatively, at least only the retard determination unit 19 may be configured to operate in response to the knock determination, while the peak-area detection unit 17 and the rate calculation unit 18 may be configured to operate at all times.

Figure 5:
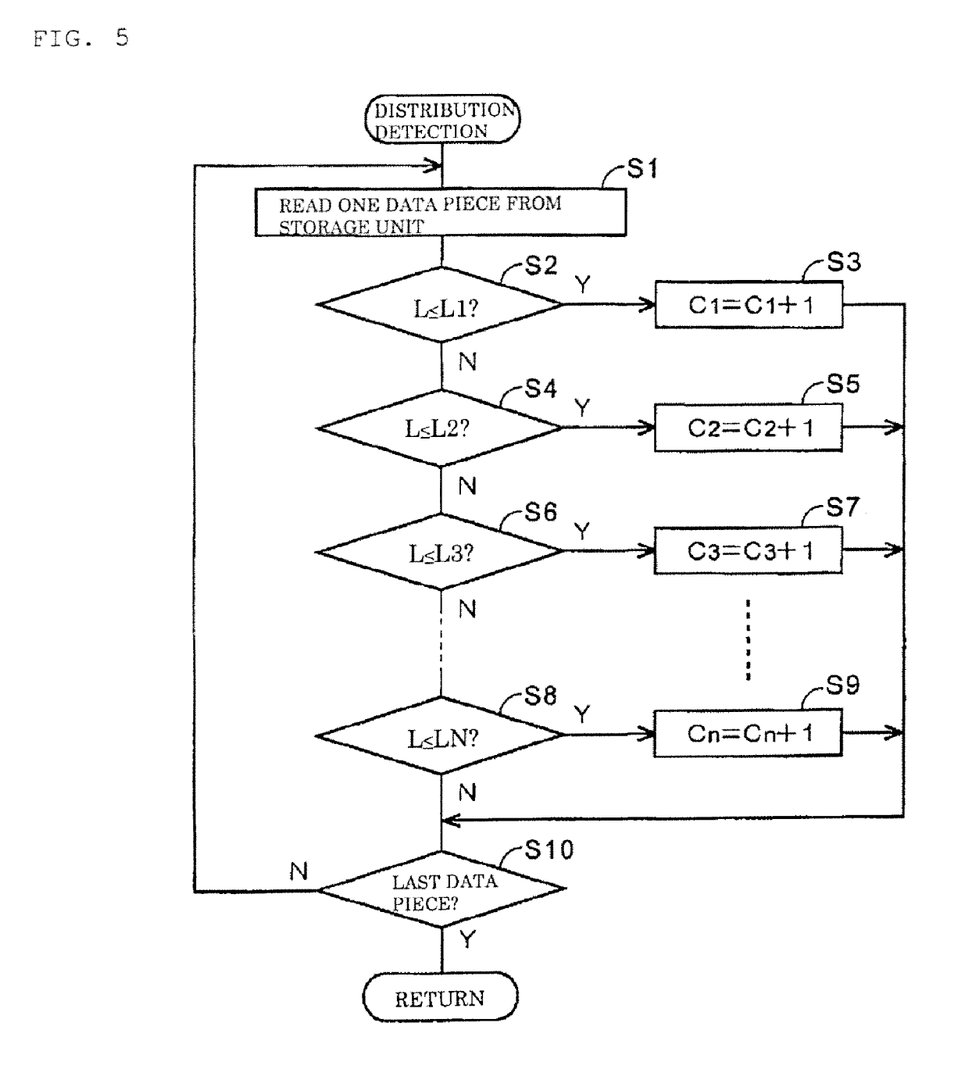
FIG. 5 is a flowchart of data distribution detection processing.

FIG. 5 is a flowchart showing processing of the data distribution detection unit 16. In step S1, one of the stored detection data pieces is read from the storage unit 14. In step S2, it is determined whether or not a knock level L of the detection data piece is not more than a first threshold L1. When the determination is affirmative in step S2, the processing proceeds to step S3 to increment a counter value C1 of a first counter. When the determination is negative in step S2, the processing proceeds to step S4 to determine whether or not the knock level L of the detection data piece is not more than a second threshold L2 (L2>L1). When the determination is affirmative in step S4, the processing proceeds to step S5 to increment a counter value C2 of a second counter. When the determination is negative in step S4, the processing proceeds to step S6 to determine whether or not the knock level L of the detection data piece is not more than a third threshold L3 (L3>L2).

When the determination is affirmative in step S6, the processing proceeds to step S7 to increment a counter value C3 of a third counter. When the determination is negative in step S6, in the subsequent processing, the knock level L is similarly compared with each of the remaining predetermined thresholds, and in step S8 the knock level L is compared with the last threshold Ln. Accordingly, the number of the thresholds is n. When the determination is affirmative in step S8, the processing proceeds to step S9 to increment an n-th counter value Cn.

When the determination is negative in step S8, the processing proceeds to step S10 to determine whether or not knock levels of all the detection data pieces in the storage unit 14 have been determined. Until the knock levels of all the detection data pieces in the storage unit are determined, the determination is negative in step S10 so that the processing returns to step S1. When all the detection data pieces in the storage unit 14 are determined, the determination becomes affirmative in step S10 so that the processing exits from this flowchart.

Figure 6:
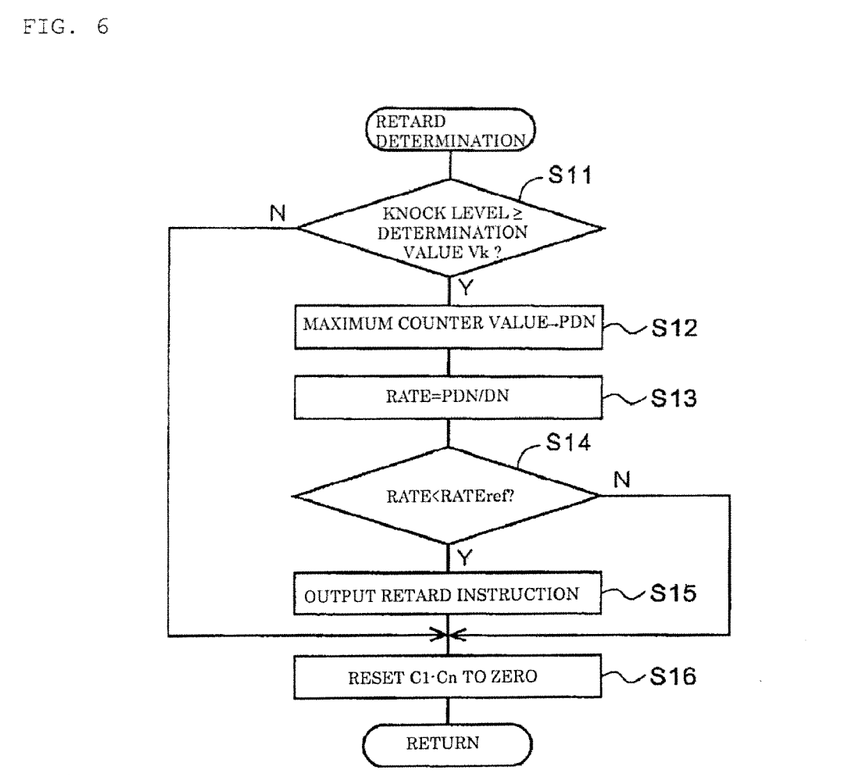
FIG. 6 is a flowchart of retard determination processing.

FIG. 6 is a flowchart showing retard determination processing. The processing corresponds to processing by the knock determination unit 15, peak-area detection unit 17, rate calculation unit 18 and retard determination unit 19. In step S11, it is determined whether a knock level voltage of a detection data piece read from the knock sensor 9 is not less than the knock determination value Vk. When the determination is affirmative in step S11, the processing proceeds to step S12. In step S12, the maximum counter value among the counter values C1 to Cn is extracted and set to the number of detection data pieces PDN. In other words, this processing determines the number of detection data pieces in a region in which the largest number of detection data pieces spread among the regions divided based on the multiple thresholds.

In step S13, the peak-area-data-piece rate RATE is calculated by dividing the number of detection data pieces PDN by the number of all the detection data pieces, namely, the total value DN of the counter values C1 to Cn. In step S14, it is determined whether the peak-area-data-piece rate RATE is not more than the retard determination rate RATEref. When the determination is affirmative in step S14, the processing proceeds to step S15 to output a retard instruction. In step S16, the counter values C1 to Cn are reset to zero. When the determination is negative in step S14, the processing skips step S15 to proceed to step S16.

When the knock level voltage is lower than the knock determination value Vk, the determination is negative in step S11. Accordingly, the retard necessity is not determined, so that the processing proceeds to step S16.

In this manner, in this embodiment, a calculation is made of how much the number of the detection data pieces in the knock level region having the highest concentration of detection data pieces accounts for the total number of the detection data pieces stored in the storage unit 14, and, when the rate is not higher than the predetermined rate, it is determined that a knock requiring a retard has occurred.

Next, another embodiment of the present invention will be described. As learned from the distribution example shown in FIG. 4, when compared with the distribution determined as absence of a knock, the distribution determined as presence of a knock has the lower peak and knock level voltages spreading widely, thus having a lower average value of the distribution. Accordingly, when the average value of the distribution is not more than a knock determination average value, a retard instruction is issued.

Figure 7:
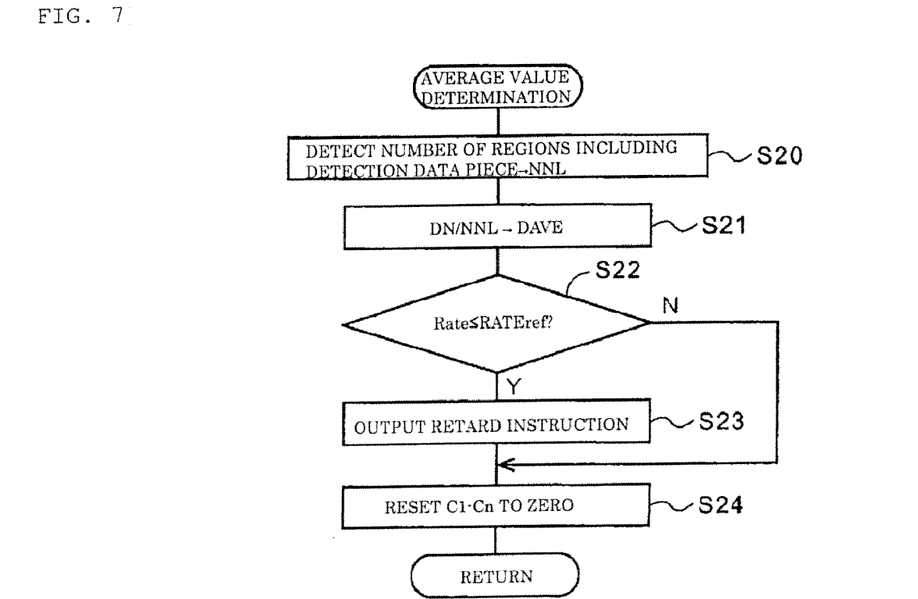
FIG. 7 is a flowchart of average-value determination according to an embodiment of the present invention.

FIG. 7 is a flowchart according to this embodiment. In step S20, the number of knock level regions NNL including at least one detection data piece is detected. In other words, the same processing as the processing in the aforementioned steps S1 to S10 is performed, and then the number of counters having a counter value of "1" or larger at the time of termination of the processing, among the counter values C1 to Cn, is detected. The number of knock level regions NNL is larger in the distribution C than in the distributions A and B, all of which are shown in FIG. 4.

In step S21, the number of detection data pieces DN stored in the storage unit 14, i.e., the number of detection data pieces processed in the similar way as in the steps S1 to S10 is divided by the number of knock level regions NNL detected in step S20, and thereby an average value DAVE is calculated.

In step S22, it is determined whether or not the average value DAVE is not more than a knock determination average value AVref. When the determination is affirmative in step S22, the processing proceeds to step S23 to output a retard instruction. In step S24, the counter values C1 to Cn are reset to zero. When the determination is negative in step S22, the processing skips step S23 to proceed to step S24.

When the knock level voltages are spread in a wide area as in the distribution C shown in FIG. 4, the average value DAVE is low. When the detection data pieces concentrate in a small knock level voltage region as in the distribution A in FIG. 4, the average value DAVE is high. Hence, a retard necessity is determined in this manner based on the degree of the average value DAVE.

Figure 8:
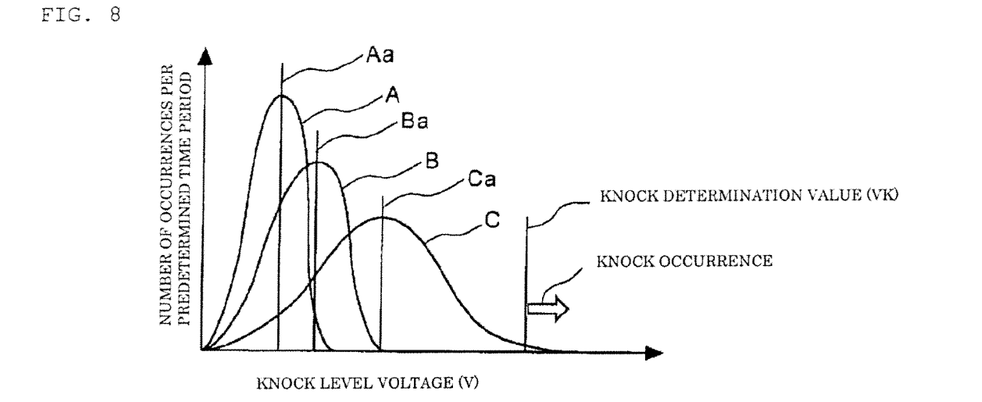
FIG. 8 is a graph showing a distribution, for each knock level voltage, in number of occurrences of detection data pieces, according to an embodiment of the present invention.

As discussed above, the necessity of a retard may be determined based on the average value of the number of occurrences of data pieces. In another embodiment, an average value may be calculated in a knock-level-voltage axis direction. A description is given by referring to FIG. 8. FIG. 8 is a graph showing a distribution in number of occurrences of data pieces for each knock level voltage, and is a graph similar to FIG. 4. In FIG. 8, reference letters Aa, Ba and Ca respectively denote average values of the distributions A, B and C, where the average values are calculated in the knock-level-voltage axis direction. FIG. 8 shows that the average value Ca, of the distribution C involving knocks, in the knock-level-voltage axis direction is higher than the average values Aa and Ba, of the distributions A and B not involving knocks, in the knock-level-voltage axis directions.

Hence, an average value of knock level voltages of all the detection data pieces stored in the storage unit 14 is calculated. When the average value is not less than a voltage average value for knock determination, a retard instruction is outputted.

Figure 9:
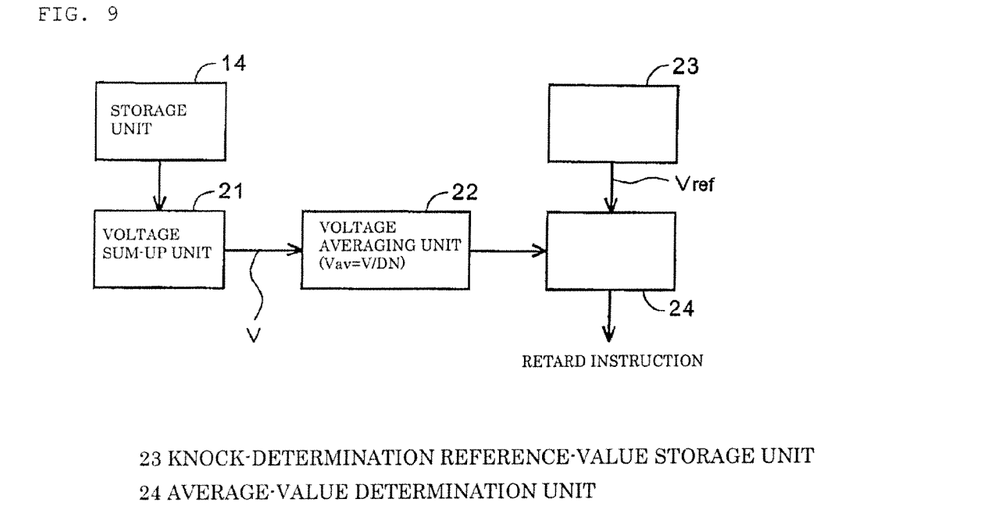
FIG. 9 is a block diagram showing functions of a chief section for average-value determination according to an embodiment of the present invention.

FIG. 9 is a block diagram showing functions of the CPU 12 according to this embodiment. In FIG. 9, a voltage sum-up unit 21 sums up values of all the detection data pieces, i.e., knock level voltage values, stored in the storage unit 14 and inputs a voltage sum-up value V thus obtained to a voltage averaging unit 22. The voltage averaging unit 22 divides the voltage sum-up value V by the total number of detection data pieces DN stored in the storage unit 14 to calculate a knock-level-voltage average value Vav of the detection data pieces.

A knock-determination reference-value storage unit 23 stores a reference value (retard determination average value) Vref for determining the knock-level-voltage average value Vav. An average-value determination unit (retard determination means) 24 compares the reference value Vref with the knock-level-voltage average value Vav. When the knock-level-voltage average value Vav is not less than the reference value Vref, the average-value determination unit 24 outputs a retard instruction.

As described above, according to this embodiment, when a knock level voltage not less than the knock determination value Vk is detected, it is possible to determine, based on the distribution of knock level voltages, whether the detected voltage having a high knock level has just unexpectedly occurred, or is one of many continuous knock level voltages representing an occurrence of a state in which knocks are likely to occur continuously. Thereby, it is possible to eliminate unnecessary retard processing.

DESCRIPTION OF REFERENCE NUMERALS

1 ENGINE
7 CYLINDER
9 KNOCK SENSOR
10 IGNITION DEVICE
11 ECU
12 MICROCOMPUTER (CPU)
15 Knock Determination Unit
16 DATA DISTRIBUTION DETECTION UNIT
17 PEAK-AREA DETECTION UNIT
18 RATE CALCULATION UNIT
19 RETARD DETERMINATION UNIT
20 IGNITION TIMING CONTROL UNIT

We claim:

1. A knock control device for an engine including a knock determination unit configured to determine whether a level of each of a plurality of detection data pieces detected by a knock sensor attached to the engine is not less than a predetermined knock determination value, and an engine output reduction unit configured to reduce engine output when the knock determination unit determines that a knocking has occurred, the knock control device comprising:
a data distribution detection unit configured to detect a distribution, for each predetermined time period, in number of occurrences of the detection data pieces in association with knock level voltages of the respective detection data pieces, wherein
when it is determined that the level of the detection data piece is not less than the knock determination value, the knock determination unit determines a necessity of engine output reduction based on the distribution in number of occurrences of the detection data pieces.

2. The knock control device according to claim 1, wherein the engine is a 4-cycle water-cooled engine having a fuel injector.

3. The knock control device according to claim 2, further comprising an engine control unit configured to read detection signals from a revolution sensor and a throttle sensor to calculate an amount of fuel to be injected by the fuel injector and to calculate ignition timing by an ignition device.

4. The knock control device according to claim 1, wherein the knock sensor is placed near a combustion chamber on an outer wall surface of the engine cylinder having a water jacket.

5. A knock control device for an engine, the knock control device comprising:
a knock sensor attached to the engine and configured to output a voltage value corresponding to vibration of the engine as a detection data piece;
a data distribution detection unit configured to detect a distribution of a plurality of the detection data pieces inputted from the knock sensor in a predetermined time period, for each of voltage values of the respective detection data pieces, by allocating the detection data pieces to voltage regions set stepwise, based on the voltage values of the respective detection data pieces;
a peak-area detection unit configured to detect one of the voltage regions as a peak area based on the distribution of the detection data pieces, the one of the voltage regions having the largest number of detection data pieces allocated thereto;
a rate calculation unit configured to calculate a rate of the number of detection data pieces included in the peak area detected by the peak-area detection unit, by dividing the number of detection data pieces included in the peak area by a total number of data pieces detected within the predetermined time period; and
a retard determination unit configured to output an ignition retard instruction when the rate calculated by the rate calculation unit is not more than a retard determination rate, wherein
the retard determination unit is configured to be energized when the level of the detection data piece from the knock sensor is not less than a predetermined knock determination voltage.

6. A knock control device for an engine, the knock control device comprising:
a knock sensor (attached to the engine and configured to output a voltage value corresponding to vibration of the engine as a detection data piece;
a data distribution detection unit configured to detect a distribution of a plurality of the detection data pieces inputted from the knock sensor in a predetermined time period, for each of voltage values of the detection data pieces, by allocating the detection data pieces to voltage regions set stepwise, based on the voltage values of the respective detection data pieces;
an averaging unit configured to calculate an average value of the number of a plurality of the detection data pieces outputted within the predetermined time period by dividing a total number of the detection data pieces by the number of the voltage regions to which the detection data pieces are allocated; and
a retard determination unit configured to output an ignition retard instruction when the average value of the number of the detection data pieces which is calculated by the averaging unit is not more than a retard determination average value, wherein
the retard determination unit is configured to be energized when the level of the detection data piece from the knock sensor is not less than a predetermined knock determination voltage.

7. A knock control device for an engine, the knock control device comprising:
a knock sensor attached to the engine and configured to output a voltage value corresponding to vibration of the engine as a detection data piece;
a data distribution detection unit configured to detect a distribution of a plurality of the detection data pieces inputted from the knock sensor in a predetermined time period, for each of voltage values of the detection data pieces, by allocating the detection data pieces to voltage regions set stepwise, on the basis of voltage values of the respective detection data pieces;
an averaging unit configured to calculate an average value of knock level voltages of a plurality of the detection data pieces outputted within the predetermined time period by dividing a sum of the knock level voltages of the detection data pieces by the number of the detection data pieces outputted within the predetermined time period; and
a retard determination unit configured to output an ignition retard instruction when the average value calculated by the averaging unit is not less than a retard determination average value, wherein
the retard determination unit is configured to be energized when the level of the detection data piece from the knock sensor is not less than a predetermined knock determination voltage.

8. A method, comprising:

determining whether a level of each of a plurality of detection data pieces, detected by a knock sensor attached to an engine, is not less than a predetermined knock determination value; and detecting a distribution, for each predetermined time period, in number of occurrences of the detection data pieces in association with knock level voltages of the respective detection data pieces, wherein when it is determined that the level of the detection data piece is not less than the knock determination value, reducing engine output based on the distribution in number of occurrences of the detection data pieces.

* * * * *